United States Patent
Kuwajima et al.

(10) Patent No.: US 11,780,212 B2
(45) Date of Patent: Oct. 10, 2023

(54) LAMINATE

(71) Applicant: DAIKIN INDUSTRIES, LTD., Osaka (JP)

(72) Inventors: Yuuki Kuwajima, Settsu (JP); Eisaku Sumino, Settsu (JP); Takeshi Inaba, Settsu (JP); Tsuyoshi Noguchi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 517 days.

(21) Appl. No.: 15/304,344

(22) PCT Filed: Apr. 15, 2015

(86) PCT No.: PCT/JP2015/061588
§ 371 (c)(1),
(2) Date: Oct. 14, 2016

(87) PCT Pub. No.: WO2015/163212
PCT Pub. Date: Oct. 29, 2015

(65) Prior Publication Data
US 2017/0043560 A1    Feb. 16, 2017

(30) Foreign Application Priority Data

Apr. 24, 2014 (JP) ................................ 2014-090305

(51) Int. Cl.
| | |
|---|---|
| *B32B 27/32* | (2006.01) |
| *B32B 25/08* | (2006.01) |
| *B32B 1/08* | (2006.01) |
| *F16L 11/04* | (2006.01) |
| *F16L 11/12* | (2006.01) |
| *B32B 27/30* | (2006.01) |
| *B32B 25/04* | (2006.01) |
| *B32B 25/14* | (2006.01) |

(52) U.S. Cl.
CPC .............. *B32B 25/08* (2013.01); *B32B 1/08* (2013.01); *B32B 25/042* (2013.01); *B32B 25/14* (2013.01); *B32B 27/304* (2013.01); *B32B 27/322* (2013.01); *F16L 11/04* (2013.01); *F16L 11/12* (2013.01); *B32B 2597/00* (2013.01)

(58) Field of Classification Search
CPC ......... B32B 1/08; B32B 25/042; B32B 25/08; B32B 25/14; B32B 2597/00; B32B 27/304; B32B 27/322; F16L 11/04; F16L 11/12
See application file for complete search history.

(56) References Cited

U.S. PATENT DOCUMENTS

| | | | | |
|---|---|---|---|---|
| 5,320,888 A | * | 6/1994 | Stevens | ............... B32B 25/08 428/36.2 |
| 2007/0015889 A1 | * | 1/2007 | Morgan | .................. C08F 6/24 526/250 |
| 2007/0100077 A1 | * | 5/2007 | Lavanga | ................. C08L 27/18 525/199 |
| 2007/0228617 A1 | * | 10/2007 | Higashi | ................... C08J 7/123 264/446 |
| 2011/0135861 A1 | * | 6/2011 | Manzara | ................. C08K 5/28 428/36.9 |
| 2012/0077926 A1 | * | 3/2012 | Ota | ........................ C08K 3/04 524/495 |

FOREIGN PATENT DOCUMENTS

| | | |
|---|---|---|
| JP | 2000-313089 A | 11/2000 |
| JP | 2005-22403 A | 1/2005 |

OTHER PUBLICATIONS

International Search Report for PCT/JP2015/061588 dated Jul. 21, 2015 [PCT/ISA/210].
International Preliminary Report on Patentability issued from the International Bureau in counterpart International Application No. PCT/JP2015/061588, dated Oct. 25, 2016.
Communication dated Nov. 2, 2017 from the European Patent Office in counterpart application No. 15782734.6.
Database WPI Week 200101, Thomson Scientific, XP002774879, Nov. 9, 2000. (3 pages total).

* cited by examiner

*Primary Examiner* — Callie E Shosho
*Assistant Examiner* — Krupa Shukla
(74) *Attorney, Agent, or Firm* — Sughrue Mion, PLLC

(57) ABSTRACT

The present invention aims to provide a laminate in which a fluororesin layer and a fluororubber layer are firmly bonded. The present invention relates to a laminate including: a fluororubber layer (A); and a fluororesin layer (B) stacked on the fluororubber layer (A), the fluororubber layer (A) being formed from a fluororubber composition, the fluororubber composition containing a fluororubber, a low molecular weight polytetrafluoroethylene, and a multifunctional compound, the amount of the multifunctional compound being 5 parts by mass or more relative to 100 parts by mass of the fluororubber.

9 Claims, No Drawings

LAMINATE

CROSS REFERENCE TO RELATED APPLICATIONS

This application is a National Stage of International Application No. PCT/JP2015/061588, filed on Apr. 15, 2015, which claims priority from Japanese Patent Application No. 2014-090305, filed on Apr. 24, 2014, the contents of all of which are incorporated herein by reference in their entirety.

TECHNICAL FIELD

The present invention relates to a laminate.

BACKGROUND ART

A current rise in environmental awareness leads to preparation of a legal framework for preventing fuel volatilization. In particular, the field of automobiles, mainly in the United States, shows a significant tendency of suppressing fuel volatilization, and has an increasing need for materials having excellent fuel barrier properties.

Specifically, a laminated hose including a fluororesin barrier layer (layers other than the barrier layer are rubber layers) for achieving favorably low fuel permeability is used as a fuel-transporting rubber hose.

Fluororubber is excellent in various properties such as heat resistance, oil resistance, and aging resistance, and thus is proposed to be used as a rubber material for the layers other than the above barrier layer.

However, the fluororesin, when used for the barrier layer, has difficulty in bonding to the fluororubber, the counter material, of the inner and outer layers. Therefore, various investigations are made in order to achieve bonding between fluororesin and fluororubber.

Patent Literature 1, for example, discloses a production method of a laminate including heat-treating a rubber layer and a thermoplastic resin layer containing a reactive functional group which are directly stacked, in which at least one of the rubber layer or the thermoplastic resin layer contains a multifunctional compound.

CITATION LIST

Patent Literature

Patent Literature 1: JP 2005-22403 A

SUMMARY OF INVENTION

Technical Problem

The present invention aims to provide a laminate in which a fluororesin layer and a fluororubber layer are firmly bonded.

Solution to Problem

The inventors have performed studies on a laminate in which a fluororesin layer and a fluororubber layer are firmly bonded without using an adhesive or performing surface treatment, and focused on a component of a fluororubber composition for forming a fluororubber layer.

The inventors have found that, surprisingly, the use of a fluororubber composition containing a specific amount of a multifunctional compound and a low molecular weight polytetrafluoroethylene with properties which are considered to adversely impact on bonding, such as slidability and low adherence, allows firm bonding between the fluororesin layer and the fluororubber layer. Thereby, the present invention has been completed.

That is, the present invention relates to a laminate including:

a fluororubber layer (A); and
a fluororesin layer (B) stacked on the fluororubber layer (A),
the fluororubber layer (A) being formed from a fluororubber composition,
the fluororubber composition containing a fluororubber, a low molecular weight polytetrafluoroethylene, and a multifunctional compound, the amount of the multifunctional compound being 5 parts by mass or more relative to 100 parts by mass of the fluororubber.

The fluororubber composition preferably contains the low molecular weight polytetrafluoroethylene in an amount of 5 to 100 parts by mass relative to 100 parts by mass of the fluororubber.

The multifunctional compound is preferably at least one selected from the group consisting of compounds containing two or more double bonds, polyamine compounds, polyhydroxy compounds, and polythiol compounds.

The fluororubber is preferably at least one selected from the group consisting of vinylidene fluoride/hexafluoropropylene copolymers, vinylidene fluoride/hexafluoropropylene/tetrafluoroethylene copolymers, tetrafluoroethylene/propylene copolymers, tetrafluoroethylene/propylene/vinylidene fluoride copolymers, ethylene/hexafluoropropylene copolymers, ethylene/hexafluoropropylene/vinylidene fluoride copolymers, ethylene/hexafluoropropylene/tetrafluoroethylene copolymers, vinylidene fluoride/tetrafluoroethylene/perfluoro(alkyl vinyl ether) copolymers, vinylidene fluoride/chlorotrifluoroethylene copolymers, and vinylidene fluoride/$CH_2$=$CFRf^3$ copolymers wherein $Rf^3$ is a linear or branched C1-C12 fluoroalkyl group.

The fluororesin layer (B) preferably includes a fluororesin, the fluororesin is at least one selected from the group consisting of a copolymer (I) obtained by polymerization of at least tetrafluoroethylene and ethylene; a copolymer (II) obtained by polymerization of at least tetrafluoroethylene and a compound represented by the formula (1):

$$CF_2=CF-Rf^1 \qquad (1)$$

wherein $Rf^1$ represents $CF_3$ or $ORf^2$ wherein $Rf^2$ represents a C1-C5 perfluoroalkyl group; and a copolymer (III) obtained by polymerization of at least vinylidene fluoride.

The fluororubber composition preferably contains a peroxide vulcanizing agent.

The fluororubber layer (A) preferably has an abrasion loss determined according to a wear test specified in JIS K 7204 of 0.10 g or less.

Preferably, in the laminate of the present invention, the fluororubber layer (A) is stacked on both sides of the fluororesin layer (B).

Preferably, in the laminate of the present invention, the fluororesin layer (B) is stacked on both sides of the fluororubber layer (A).

Preferably, the laminate of the present invention further includes a fluorine-free rubber layer (C1a), and in the laminate, the layers are stacked in the order of the fluororubber layer (A), the fluororesin layer (B), and the fluorine-free rubber layer (C1a).

Preferably, the laminate of the present invention further includes a fluorine-free rubber layer (D1a), and in the laminate, the layers are stacked in the order of the fluorine-free rubber layer (D1a), the fluororubber layer (A), the fluororesin layer (B), and the fluorine-free rubber layer (C1a); in the order of the fluororubber layer (A), the fluororesin layer (B), the fluorine-free rubber layer (D1a), and the fluorine-free rubber layer (C1a); or in the order of the fluororubber layer (A), the fluororesin layer (B), the fluorine-free rubber layer (C1a), and the fluorine-free rubber layer (D1a).

Preferably, in the laminate of the present invention, the fluororubber layer (A) and the fluororesin layer (B) are vulcanization-bonded to each other.

The laminate of the present invention is preferably a sealant for semiconductor manufacturing processes or a fuel pipe hose.

Advantageous Effects of Invention

The laminate of the present invention having the aforementioned configuration includes a fluororesin layer and a fluororubber layer which are firmly bonded.

DESCRIPTION OF EMBODIMENTS

The laminate of the present invention includes a fluororubber layer (A) and a fluororesin layer (B) stacked on the fluororubber layer (A).

The respective constitutional components are described below.

Fluororubber Layer (A)

The fluororubber layer (A) is formed from a fluororubber composition. The fluororubber layer (A) is usually obtained by molding a fluororubber composition to provide an unvulcanized fluororubber layer, and then vulcanizing the unvulcanized fluororubber layer.

The fluororubber composition contains a fluororubber, a low molecular weight polytetrafluoroethylene, and a multifunctional compound. The fluororubber composition containing a low molecular weight PTFE and a specific amount of a multifunctional compound allows firm bonding between the fluororubber layer (A) formed from the fluororubber composition and the fluororesin layer (B).

Further, the fluororubber composition containing a low molecular weight PTFE and a specific amount of a multifunctional compound allows the reduction of the temperature when the fluororubber layer (A) and the fluororesin layer (B) are bonded to each other. For example, bonding can be performed at a temperature lower than the melting point of the fluororesin. In such a case, the fluororesin can be molded without being molten and thus a laminate with a stable shape can be obtained. Further, the bonding time can be reduced.

Further, the use of the fluororubber composition containing a specific amount of a multifunctional compound and a low molecular weight PTFE enhances the abrasion resistance of the laminate (fluororubber layer (A)).

In cases where a fluororubber is blended with a large amount of a multifunctional compound without adding a low molecular weight PTFE, they are hardly uniformly mixed, whereas, in the fluororubber composition containing a low molecular weight PTFE, the fluororubber and a specific amount of the multifunctional compound are readily uniformly mixed, and are readily processed into a fluororubber composition. As described, since the fluororubber composition can be produced with good processability, the production time of the fluororubber composition is reduced so that the production time of the laminate produced using the fluororubber composition is reduced. That is, the laminate of the present invention also has good productivity.

[Fluororubber]

The fluororubber is usually formed from an amorphous polymer having a fluorine atom that is coupled with a carbon atom constituting the main chain and has rubber elasticity. The fluororubber may be formed from one polymer, or may be formed from two or more polymers. The fluororubber usually has no obvious melting point.

The fluororubber is preferably at least one selected from the group consisting of vinylidene fluoride (VdF)/hexafluoropropylene (HFP) copolymers, VdF/HFP/tetrafluoroethylene (TFE) copolymers, TFE/propylene copolymers, TFE/propylene/VdF copolymers, ethylene/HFP copolymers, ethylene/HFP/VdF copolymers, ethylene/HFP/TFE copolymers, VdF/TFE/perfluoro(alkyl vinyl ether) (PAVE) copolymers, VdF/chlorotrifluoroethylene (CTFE) copolymers, and VdF/CH$_2$=CFRf$^3$ copolymers wherein Rf$^3$ is a linear or branched C1-C12 fluoroalkyl group. The fluororubber is preferably a non-perfluororubber, more preferably a copolymer containing a polymerized unit derived from vinylidene fluoride (VdF unit).

The VdF unit-containing copolymer is preferably a copolymer containing a VdF unit and a copolymerized unit derived from a fluorine-containing ethylenic monomer (excluding a VdF unit, hereinafter, also referred to as "fluorine-containing ethylenic monomer unit (a)"). The VdF unit-containing copolymer may consist only of a VdF unit and a fluorine-containing ethylenic monomer unit (a), or may further contain a copolymerized unit derived from a monomer copolymerizable with VdF and a fluorine-containing ethylenic monomer (excluding VdF, hereinafter also referred to as "fluorine-containing ethylenic monomer (a)").

The VdF unit-containing copolymer contains, relative to 100 mol % of the total of the VdF unit and the fluorine-containing ethylenic monomer unit (a), preferably 30 to 90 mol % of the VdF unit and 70 to 10 mol % of the fluorine-containing ethylenic monomer unit (a), more preferably 30 to 85 mol % of the VdF unit and 70 to 15 mol % of the fluorine-containing ethylenic monomer unit (a), still more preferably 30 to 80 mol % of the VdF unit and 70 to 20 mol % of the fluorine-containing ethylenic monomer unit (a).

The amount of the copolymerized unit derived from a monomer copolymerizable with VdF and the fluorine-containing ethylenic monomer (a) (excluding a VdF unit) is preferably 0 to 10 mol % relative to the total amount of the VdF unit and the copolymerized unit derived from the fluorine-containing ethylenic monomer (a).

Examples of the fluorine-containing ethylenic monomer (a) include fluorine-containing monomers such as TFE, CTFE, trifluoroethylene, HFP, trifluoropropylene, tetrafluoropropylene, pentafluoropropylene, trifluorobutene, tetrafluoroisobutene, PAVE, vinyl fluoride, fluorovinyl ethers represented by the formula (2):

$$CFX=CXOCF_2OR^1 \qquad (2)$$

wherein Xs are the same as or different from each other, and each represent H, F, or $CF_3$; and $R^1$ represents a linear or branched C1-C6 fluoroalkyl group optionally containing one or two atoms which consist of at least one atom selected from the group consisting of H, Cl, Br, and I, or a C5-C6 cyclic fluoroalkyl group optionally containing one or two atoms which consist of at least one atom selected from the group consisting of H, Cl, Br, and I. In particular, at least one selected from the group consisting of fluorovinyl ethers represented by the formula (2), TFE, HFP, and PAVE is preferred, and at least one selected from the group consisting of TFE, HFP, and PAVE is more preferred.

The PAVE is preferably represented by the formula (3):

$$CF_2=CFO(CF_2CFY^1O)_p—(CF_2CF_2CF_2O)_q—Rf \qquad (3)$$

wherein $Y^1$ represents F or $CF_3$; Rf represents a C1-C5 perfluoroalkyl group; p represents an integer of 0 to 5; and q represents an integer of 0 to 5.

The PAVE is more preferably perfluoro(methyl vinyl ether) or perfluoro(propyl vinyl ether), still more preferably perfluoro(methyl vinyl ether). Each of these may be used alone or in any combination.

Examples of the monomer copolymerizable with VdF and the fluorine-containing ethylenic monomer (a) include ethylene, propylene, and alkyl vinyl ethers.

Specific preferred examples of such a VdF unit-containing copolymer include at least one copolymer selected from the group consisting of VdF/HFP copolymers, VdF/HFP/TFE copolymers, VdF/CTFE copolymers, VdF/CTFE/TFE copolymers, VdF/PAVE copolymers, VdF/TFE/PAVE copolymers, VdF/HFP/PAVE copolymers, and VdF/HFP/TFE/PAVE copolymers. Particularly preferred among these VdF unit-containing copolymers is at least one copolymer selected from the group consisting of VdF/HFP copolymers and VdF/HFP/TFE copolymers from the viewpoint of heat resistance. These VdF unit-containing copolymers preferably meet the above-described proportions of the VdF unit and the fluorine-containing ethylenic monomer unit (a).

The VdF/HFP copolymer preferably has a mole ratio VdF/HFP of (45 to 85)/(55 to 15), more preferably (50 to 80)/(50 to 20), still more preferably (60 to 80)/(40 to 20).

The VdF/HFP/TFE copolymer preferably has a mole ratio VdF/HFP/TFE of (40 to 80)/(10 to 35)/(10 to 35).

The VdF/PAVE copolymer preferably has a mole ratio VdF/PAVE of (65 to 90)/(10 to 35).

The VdF/TFE/PAVE copolymer preferably has a mole ratio VdF/TFE/PAVE of (40 to 80)/(3 to 40)/(15 to 35).

The VdF/HFP/PAVE copolymer preferably has a mole ratio VdF/HFP/PAVE of (65 to 90)/(3 to 25)/(3 to 25).

The VdF/HFP/TFE/PAVE copolymer preferably has a mole ratio VdF/HFP/TFE/PAVE of (40 to 90)/(0 to 25)/(0 to 40)/(3 to 35), more preferably (40 to 80)/(3 to 25)/(3 to 40)/(3 to 25).

The fluororubber is also preferably a copolymer containing a copolymerized unit derived from a monomer that imparts a cross-linking site. Examples of the monomer that imparts a cross-linking site include iodine-containing monomers such as perfluoro(6,6-dihydro-6-iodo-3-oxa-1-hexene) and perfluoro(5-iodo-3-oxa-1-pentene) described in JP H05-63482 B and JP H07-316234 A, bromine-containing monomers described in JP H04-505341 T, cyano group-containing monomers, carboxyl group-containing monomers, and alkoxycarbonyl group-containing monomers described in JP H04-505345 T and JP H05-500070 T.

The fluororubber is also preferably one having an iodine atom or a bromine atom at an end of the main chain thereof. A fluororubber having an iodine atom or a bromine atom at an end of the main chain thereof can be produced by emulsion polymerization of monomers with a radical initiator in an aqueous medium in the presence of a halogen compound and in the substantial absence of oxygen. A typical halogen compound used may be, for example, a compound represented by the formula:

$$R^2I_xBr_y$$

wherein x and y each represent an integer of 0 to 2 and satisfy $1 \leq x+y \leq 2$; and $R^2$ is a saturated or unsaturated C1-C16 fluorohydrocarbon group or a saturated or unsaturated C1-C16 chlorofluoro hydrocarbon group, a C1-C3 hydrocarbon group, or a C3-C10 cyclic hydrocarbon group optionally replaced by an iodine atom or a bromine atom, each of which may optionally contain an oxygen atom.

Examples of the halogen compound include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1, 3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, monoiodomonobromo-substituted benzene, diiodomonobromo-substituted benzene, and (2-iodoethyl)- and (2-bromoethyl)-substituted benzene. Each of these compounds may be used alone or in any combination.

In particular, 1,4-diiodoperfluorobutane or diiodomethane is preferred from the viewpoints of polymerization reactivity, cross-linking reactivity, and easy availability.

The fluororubber preferably has a Mooney viscosity ($ML_{1+10}$ (100° C.)) of 5 to 200, more preferably 10 to 150, still more preferably 20 to 100, from the viewpoint of good processability in the production of the fluororubber composition.

The Mooney viscosity can be determined in conformity with ASTM D 1646.
Measurement apparatus: MV2000E, ALPHA TECHNOLOGIES
Rotor rotation speed: 2 rpm
Measurement temperature: 100° C.

The rubber component of the fluororubber composition preferably consists only of the fluororubber.

The fluororubber composition contains a low molecular weight polytetrafluoroethylene (PTFE). The fluororubber composition containing the low molecular weight PTFE and a specific amount of the multifunctional compound provides a firmly bonded laminate. Further, even the fluororubber composition contains a large amount of the multifunctional compound (5 parts by mass or more relative to 100 parts by mass of the fluororubber), the processability in the production of the fluororubber composition can be enhanced and the productivity of the laminate can be enhanced.

The low molecular weight PTFE is a TFE polymer having a number average molecular weight of 600,000 or less. A "High molecular weight PTFE" with a number average molecular weight of greater than 600,000 exhibits fibrillability distinctive of PTFE (see, for example, JP H10-147617 A). A high molecular weight PTFE has a high melt viscosity and is not-melt fabricable. A high molecular weight PTFE exhibits fibrillation properties when used as an additive. Therefore, the PTFE particles readily agglomerate and thus have poor dispersibility in a matrix material.

The low molecular weight PTFE is a TFE polymer having a melt viscosity at 380° C. of $1\times10^2$ to $7\times10^5$ (Pa·s). When the PTFE has a melt viscosity within this range, the number-average molecular weight thereof will fall within the above-indicated range.

The melt viscosity is a value measured by pre-heating a 2-g sample at 380° C. for 5 minutes and keeping it at the above temperature under a load of 0.7 MPa using a flow tester (Shimadzu Corporation) and a 2φ-8L die in accordance with ASTM D 1238. Each of the number-average molecular weights is a value calculated from the melt viscosity measured in the above manner.

The low molecular weight PTFE is preferably a TFE polymer having a melting point of 324° C. to 333° C.

The low molecular weight PTFE preferably has an average particle size of 0.5 to 20 μm.

The average particle size is considered to be equal to the particle size corresponding to a value of 50% of the cumulative volume in the particle size distribution determined using a laser diffraction type particle size distribution analyzer (for example, a product of Japan Laser Corporation) at a pressure of 0.1 MPa and a measurement time of three seconds without cascade impaction.

The low molecular weight PTFE preferably has a melt flow rate (MFR) at 372° C. (load 1.2 kg) of 0.01 to 10 g/10 min.

The MFR can be determined by measuring the weight (g) of the polymer flowed out of a nozzle (diameter: 2 mm, length: 8 mm) per unit time (10 minutes) at 372° C. under a load of 1.2 kg using a melt indexer (for example, a product of Toyo Seiki Seisaku-sho, Ltd.).

The low molecular weight PTFE may be a TFE homopolymer or a modified PTFE containing a TFE unit and a modifying monomer unit copolymerizable with TFE.

The amount of the modifying monomer unit copolymerizable with TFE in the modified PTFE is preferably 0.01% to 1% by weight, more preferably 0.01% to 0.5% by weight, most preferably 0.03% to 0.3% by weight in all the monomer units.

The modifying monomer unit herein means a moiety which is a part of the molecular structure of the modified PTFE and is derived from the modifying monomer, and the monomer units mean all moieties derived from all the monomers in the molecular structure of the modified PTFE. The amount of the modifying monomer unit is a value measured by infrared spectroscopic analysis or NMR (nuclear magnetic resonance) analysis.

The modifying monomer in the modified PTFE may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; and ethylene. One modifying monomer may be used, or two or more modifying monomers may be used in combination.

Examples of the perfluorovinyl ether include, but are not limited to, perfluoro unsaturated compounds represented by the formula (I):

$$CF_2=CF-ORf \tag{I}$$

wherein Rf represents a perfluoro organic group. The "perfluoro organic group" herein means an organic group in which the hydrogen atoms bonded to carbon atoms are all replaced by fluorine atoms. The perfluoro organic group may contain ether oxygen.

Examples of the perfluorovinyl ether include perfluoro (alkyl vinyl ether) (PAVE) represented by the formula (I) wherein Rf represents a C1-C10 perfluoroalkyl group. The perfluoroalkyl group preferably has a carbon number of 1 to 5.

Examples of the perfluoroalkyl group in the PAVE include perfluoromethyl, perfluoroethyl, perfluoropropyl, perfluorobutyl, perfluoropentyl, and perfluorohexyl groups. Perfluoropropyl vinyl ether (PPVE) in which the perfluoroalkyl group is a perfluoropropyl group is preferred.

Examples of the perfluorovinyl ether further include the compounds represented by the formula (I) wherein Rf is a C4-C9 perfluoro(alkoxyalkyl) group, those in which Rf is a group represented by the formula:

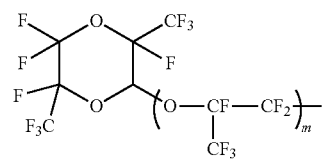

wherein m represents an integer of 0 or 1 to 4, and those in which Rf is a group represented by the formula:

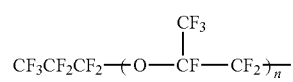

wherein n represents an integer of 1 to 4.

Examples of the perfluoroalkylethylene include, but are not limited to, perfluorobutylethylene (PFBE) and perfluorohexylethylene.

The modifying monomer in the modified PTFE is preferably at least one monomer selected from the group consisting of HFP, CTFE, VDF, PPVE, PFBE, and ethylene. HFP is more preferred.

The low molecular weight PTFE is preferably a modified PTFE, more preferably a modified PTFE containing a TFE unit and a polymerized unit derived from HFP (HFP unit).

For firmer bonding between the fluororubber layer (A) and the fluororesin layer (B), the amount of the low molecular weight PTFE in the fluororubber composition is preferably 5 to 100 parts by mass relative to 100 parts by mass of the fluororubber. The amount of the low molecular weight PTFE is more preferably 10 parts by mass or more, still more preferably 15 parts by mass or more, particularly preferably 20 parts by mass or more. The amount of the low molecular weight PTFE is more preferably 80 parts by mass or less, still more preferably 60 parts by mass or less, particularly preferably 40 parts by mass or less. The fluororubber composition containing too small an amount of the low molecular weight PTFE has insufficient processability in the production of the fluororubber composition, and insufficient abrasion resistance and insufficient bonding of the laminate. The fluororubber composition containing too large an amount thereof has poor rubber properties.

The fluororubber composition contains a multifunctional compound, and the amount of the multifunctional compound is 5 parts by mass or more relative to 100 parts by mass of the fluororubber.

In the laminate of the present invention, the fluororubber layer (A) is formed from the fluororubber composition containing the low molecular weight PTFE and a specific amount of the multifunctional compound. Thus, the fluororubber layer (A) and the fluororesin layer (B) are firmly bonded.

The multifunctional compound is preferably at least one selected from the group consisting of compounds containing two or more double bonds, polyamine compounds, polyhydroxy compounds, and polythiol compounds. In particular, the multifunctional compound is preferably a compound containing two or more double bonds. When an organic peroxide compound is used as a vulcanizing agent added to the rubber layer, the multifunctional compound serves also as a vulcanization aid.

The compound containing two or more double bonds is essentially effective as long as it is a peroxide-vulcanizable compound, specifically, a compound having reaction activity to peroxy radicals and polymer radicals. Examples of the compound include, but are not limited to, polyvalent vinyl compounds, polyvalent allyl compounds, and polyvalent (meth)acrylic acid esters. Preferred examples thereof include triallyl cyanurate, triallyl isocyanurate, fluorinated triallyl isocyanurate, triacrylic formal, triallyl trimellitate, ethylenebismaleimide, N,N'-m-phenylenebismaleimide, dipropargylterephthalate, diallyl phthalate, tetraallyl terephthalamide, tris(diallylamine)-s-triazine, triallyl phosphite, N,N-diallyl acrylamide, and trimethylolpropane trimethacrylate.

In particular, the multifunctional compound is preferably triallyl isocyanurate because a cured article with good physical properties and thermal stability is provided.

For firmer bonding between the fluororubber layer (A) and the fluororesin layer (B), the amount of the multifunctional compound in the fluororubber composition is more preferably 6 parts by mass or more, still more preferably 7 parts by mass or more relative to 100 parts by mass of the fluororubber.

From the viewpoint of flexibility, the amount of the multifunctional compound is more preferably 30 parts by mass or less, still more preferably 25 parts by mass or less, particularly preferably 20 parts by mass or less.

The fluororubber composition preferably further contains a vulcanizing agent. The vulcanizing agent may be appropriately determined in accordance with the kind of the fluororubber. At least one vulcanizing agent selected from the group consisting of peroxide vulcanizing agents, polyol vulcanizing agents, and amine vulcanizing agents are preferred, and peroxide vulcanizing agents are particularly preferred.

The peroxide vulcanizing agent may be any agent, and may be an organic peroxide. The organic peroxide is preferably one readily generating peroxy radicals in the presence of heat or a redox system. Examples thereof include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy) hexane, 2,5-dimethyl-2,5-di(t-butylperoxy) hexyne-3, benzoyl peroxide, t-butylperoxybenzene, 2,5-dimethyl-2,5-di(benzoylperoxy) hexane, t-butylperoxymaleic acid, and t-butylperoxy isopropyl carbonate. More preferred are dialkyl compounds.

The amount thereof is usually appropriately selected in accordance with the amount of active —O—O—, the decomposition temperature, and others. The amount thereof is usually 0.1 to 15 parts by mass, preferably 0.3 to 5 parts by mass relative to 100 parts by mass of the fluororubber.

The organic peroxide used as a vulcanizing agent may be combined with a vulcanization aid or a co-vulcanizing agent. The vulcanization aid and the co-vulcanizing agent may be any agent, such as the aforementioned vulcanization aids and co-vulcanizing agents.

The amount of the vulcanization aid or the co-vulcanizing agent is preferably 0.2 to 10 parts by mass, more preferably 0.3 to 6 parts by mass, still more preferably 0.5 to 5 parts by mass relative to 100 parts by mass of the fluororubber. If the amount of the vulcanizing agent or the co-vulcanizing agent is more than 10 parts by mass, the vulcanization density tends to be too high, causing cracks during compression.

The fluororubber composition may contain, as an acid acceptor or a compounding agent for improving the bonding between the fluororubber layer (A) and the fluororesin layer (B), at least one compound selected from the group consisting of metal oxides, metal hydroxides, weak acid salts of alkali metals, and weak acid salts of alkaline earth metals.

Examples of the metal oxides, metal hydroxides, weak acid salts of alkali metals, and weak acid salts of alkaline earth metals include oxides, hydroxides, carbonates, carboxylates, silicates, borates, and phosphites of metals in the group II of the Periodic table, and oxides, basic carbonates, basic carboxylates, basic phosphites, and basic sulfites of metals in the group IV of the Periodic table.

Specific examples of the metal oxides, metal hydroxides, weak acid salts of alkali metals, and weak acid salts of alkaline earth metals include magnesium oxide, zinc oxide, magnesium hydroxide, barium hydroxide, magnesium carbonate, barium carbonate, calcium oxide (quicklime), calcium hydroxide (slaked lime), calcium carbonate, calcium silicate, calcium stearate, zinc stearate, calcium phthalate, calcium phosphite, tin oxide, and basic tin phosphite.

In the case of using an organic peroxide as a vulcanizing agent, the amount of the metal oxide, metal hydroxide, weak acid salt of an alkali metal, and weak acid salt of an alkaline earth metal is preferably 5 parts by mass or less, more preferably 3 parts by mass or less. For good acid resistance, containing no such substances is still more preferred.

The fluororubber composition may contain any additives usually blended to the fluororubber composition, if necessary. Examples thereof include fillers, processing aids, plasticizers, colorants, stabilizers, adhesive aids, acid acceptors, release agents, conductivity-imparting agents, thermal-conductivity-imparting agents, surface non-adhesive agents, flexibility-imparting agents, heat resistance improvers, and flame retarders. Further, the fluororubber composition may contain one or more of usual vulcanizing agents and vulcanization accelerators other than those mentioned above.

Examples of the fillers include carbon black. The amount of the carbon black is preferably 5 to 40 parts by mass, more preferably 10 to 30 parts by mass relative to 100 parts by mass of the fluororubber. Use of the carbon black advantageously improves properties such as mechanical properties and heat resistance.

The fluororubber composition can be obtained by kneading the fluororubber, the low molecular weight PTFE, and the multifunctional compound, and if necessary any other additives such as a vulcanizing agent, a vulcanization aid, a co-vulcanizing agent, a vulcanization accelerator, and a filler, using a commonly used rubber kneading device. The rubber-kneading device used may be a roll, a kneader, a Banbury mixer, an internal mixer, a twin-screw extruder, or the like.

The fluororubber layer (A) has an abrasion loss measured according to the wear test specified in JIS K 7204 of preferably less than 0.10 g, more preferably less than 0.06 g. The fluororubber layer (A) having a small abrasion loss in the wear test within the above specific range can be used for a long time even in an environment where the layer (A) worn.

Fluororesin Layer (B)

The fluororesin layer (B) contains a fluororesin. The fluororesin is obtained by polymerization of at least one fluorine-containing ethylenic monomer (b), and may be obtained by polymerization of the fluorine-containing ethylenic monomer (b) and a fluorine-free ethylenic monomer (c). One or more kinds of the fluorine-containing ethylenic monomer (b) and the fluorine-free ethylenic monomer (c) may be used. The fluororesin usually has an obvious melting point.

Examples of the fluorine-containing ethylenic monomer (b) include tetrafluoroethylene, vinylidene fluoride, chlorotrifluoroethylene, vinyl fluoride, hexafluoropropylene, hexafluoroisobutene, monomers represented by the formula (4):

$$CH_2=CX^1(CF_2)_nX^2 \quad (4)$$

(wherein $X^1$ represents H or F; $X^2$ represents H, F, or Cl; and n represents an integer of 1 to 10), and perfluoro(alkyl vinyl ethers).

The fluorine-free ethylenic monomer (c) is preferably an ethylenic monomer containing not more than five carbon atoms from the viewpoint of no risk of reduction in the heat resistance and chemical resistance of the resulting fluororesin, and examples thereof include ethylene, propylene, 1-butene, 2-butene, vinyl chloride, and vinylidene chloride.

In preparing the fluororesin by polymerization of the fluorine-containing ethylenic monomer (b) and the fluorine-free ethylenic monomer (c), the composition of the monomers is preferably such that the proportion of the monomer unit derived from the fluorine-containing ethylenic monomer (b) is 10 to 100 mol % and the proportion of the monomer unit derived from the fluorine-free ethylenic monomer (c) is 0 to 90 mol %, more preferably the proportion of the monomer unit derived from the fluorine-containing ethylenic monomer (b) is 30 to 100 mol % and the proportion of the monomer unit derived from the fluorine-free ethylenic monomer (c) is 0 to 70 mol %. If the proportion of the monomer unit derived from the fluorine-containing ethylenic monomer (b) is less than 10 mol %, the fluororesin will fail to acquire the fluororesin-specific characteristics. Thus, such a value is not preferred.

The melting point of the fluororesin can be adjusted by selecting the types, the combination, and the constitutional ratio of the fluorine-containing ethylenic monomer (b) and the fluorine-free ethylenic monomer (c). The properties of the fluororesin can be adequately selected according to the purpose and use of the bonding and the purpose and use of the resulting laminate.

The fluororesin is preferably a copolymer containing a tetrafluoroethylene unit as an essential component from the viewpoint of heat resistance and chemical resistance.

Preferred specific examples of the fluororesin include the following copolymers (I) to (III) obtained by polymerization of the monomer(s), which are excellent in heat resistance, chemical resistance, weather resistance, electrical insulation, and non-adhesiveness. These copolymers are as follows:

(I) a copolymer obtained by polymerization of at least tetrafluoroethylene and ethylene;

(II) a copolymer obtained by polymerization of at least tetrafluoroethylene and a compound represented by the formula (1):

$$CF_2=CF-Rf^1 \quad (1)$$

wherein $Rf^1$ represents $CF_3$ or $ORf^2$ wherein $Rf^2$ represents a C1-C5 perfluoroalkyl group; and (III) a copolymer obtained by polymerization of at least vinylidene fluoride.

In particular, the fluororesin is preferably the copolymer (I) because use thereof readily provides a resin body having a low melting point and good melt moldability.

Examples of the copolymer (I) include copolymers obtained by polymerization of at least 20 to 89 mol % of tetrafluoroethylene (for example, at most 60 mol %), 10 to 79 mol % of ethylene (for example, at least 20 mol % and at most 60 mol %), and 0 to 70 mol % of a monomer copolymerizable therewith.

Examples of the monomer copolymerizable with tetrafluoroethylene and ethylene include hexafluoropropylene, chlorotrifluoroethylene, monomers represented by the formula (4):

$$CH_2=CX^1(CF_2)_nX^2 \quad (4)$$

(wherein $X^1$ represents H or F; $X^2$ represents H, F, or Cl; and n represents an integer of 1 to 10), perfluoro(alkyl vinyl ethers), and propylene. One or two or more of these are usually used.

The copolymer (I) is particularly excellent in heat resistance, chemical resistance, weather resistance, electrical insulation, non-adhesiveness, gas barrier properties, elution resistance, and bacteria resistance.

In particular, the copolymer (I) is preferably at least one selected from the group consisting of (I-1) a copolymer obtained by polymerization of at least 40 to 80 mol % of tetrafluoroethylene, 20 to 60 mol % of ethylene, and 0 to 10 mol % of a monomer copolymerizable with tetrafluoroethylene and ethylene, and (I-2) a copolymer obtained by polymerization of at least 20 to 80 mol % of tetrafluoroethylene, 10 to 80 mol % of ethylene, 0 to 30 mol % of hexafluoropropylene, and 0 to 10 mol % of a monomer copolymerizable with tetrafluoroethylene and ethylene because these copolymers can maintain the excellent characteristics of the tetrafluoroethylene-ethylene copolymer.

For example, the copolymer (II) is preferably at least one selected from the group consisting of (II-1) a copolymer obtained by polymerization of at least 65 to 95 mol % (preferably at least 75 mol %) of tetrafluoroethylene and 5 to 35 mol % (preferably at most 25 mol %) of hexafluoropropylene;

(II-2) a copolymer obtained by polymerization of at least 70 to 99 mol % of tetrafluoroethylene and 1 to 30 mol % of a monomer represented by $CF_2=CFORf^2$ wherein $Rf^2$ represents a C1-C5 perfluoroalkyl group;

(II-3) a copolymer obtained by polymerization of at least tetrafluoroethylene, hexafluoropropylene, and a monomer represented by $CF_2=CFORf^2$ wherein $Rf^2$ is as defined above, the total amount of the hexafluoropropylene and the monomer represented by $CF_2=CFORf^2$ being 5 to 30 mol %; and (II-4) a copolymer obtained by polymerization of at least tetrafluoroethylene, chlorotrifluoroethylene, and a monomer represented by $CF_2=CFORf^2$ wherein $Rf^2$ is as defined above, the total amount of the tetrafluoroethylene and the chlorotrifluoroethylene being 90 to 99.9 mol %.

The copolymer (II-2), copolymer (II-3), and copolymer (II-4) are perhalogenated copolymers, and are excellent in such characteristics as heat resistance, chemical resistance, water repellency, non-adhesiveness, electrical insulation, barrier properties, elution resistance, and bacteria resistance.

The copolymer (III) is, for example, a copolymer obtained by polymerization of at least 15 to 99 mol % of vinylidene fluoride, 0 to 80 mol % of tetrafluoroethylene, and 0 to 30 mol % of at least one of hexafluoropropylene or chlorotrifluoroethylene.

Examples of the copolymer (III) include (III-1) a copolymer obtained by polymerization of at least 30 to 99 mol % of vinylidene fluoride and 1 to 70 mol % of tetrafluoroethylene;

(III-2) a copolymer obtained by polymerization of at least 60 to 90 mol % of vinylidene fluoride, 0 to 30 mol % of tetrafluoroethylene, and 1 to 20 mol % of chlorotrifluoroethylene;

(III-3) a copolymer obtained by polymerization of at least 60 to 95 mol % of vinylidene fluoride, 0 to 30 mol % of tetrafluoroethylene, and 5 to 30 mol % of hexafluoropropylene; and (III-4) a copolymer obtained by polymerization of at least 15 to 60 mol % of vinylidene fluoride, 35 to 80 mol % of tetrafluoroethylene, and 5 to 30 mol % of hexafluoropropylene.

The fluororesin may have at least one reactive functional group selected from the group consisting of a carbonyl group, a hydroxyl group, a heterocyclic group, and an amino group at a main chain end and/or a side chain of the polymer.

The term "carbonyl group" herein means a carbon divalent group that is constituted by a carbon-oxygen double bond and is typified by —C(=O)—. The reactive functional group having the carbonyl group may be any group, and examples thereof include those having a carbonyl group as part of the chemical structure, such as a carbonate group, a carboxylic halide group (halogenoformyl group), a formyl group, a carboxyl group, an ester bond (—C(=O)O—), an acid anhydride bond (—C(=O)O—C(=O)—), an isocyanate group, an amide group, an imide group (—C(=O)—NH—C(=O)—), an urethane bond (—NH—C(=O)O—), a carbamoyl group ($NH_2$—C(=O)—), a carbamoyloxy group ($NH_2$—C(=O)O—), an ureido group ($NH_2$—C(=O)—NH—), and an oxamoyl group ($NH_2$—C(=O)—C(=O)—).

The hydrogen atom(s) coupled with the nitrogen atom(s) in the amide group, the imide group, the urethane bond, the carbamoyl group, the carbamoyloxy group, the ureido group, the oxamoyl group, and others may be replaced by a hydrocarbon group such as an alkyl group.

For easy introduction of the group and for appropriate heat resistance and good bonding at relatively low temperature of the fluororesin, the reactive functional group is preferably an amide group, a carbamoyl group, a hydroxyl group, a carboxyl group, a carbonate group, a carboxylic halide group, or an acid anhydride bond, more preferably an amide group, a carbamoyl group, a hydroxyl group, a carbonate group, a carboxylic halide group, or an acid anhydride bond.

The fluororesin can be produced by any conventionally known polymerization method such as suspension polymerization, solution polymerization, emulsion polymerization, or bulk polymerization. The polymerization conditions such as temperature and pressure and whether a polymerization initiator and other additives are used or not can be appropriately adjusted in accordance with the composition and the amount of the fluororesin.

The fluororesin preferably has a molecular weight within a range that enables the formation of the fluororesin at not higher than the thermal decomposition temperature and enables the resulting laminate to exert good fuel permeation resistance originated from the fluororesin. The melt flow rate (MFR), used as an indicator of molecular weight, at a temperature within the range of about 200° C. to about 400° C., which is a molding temperature range for usual fluororesin, is preferably 0.5 to 100 g/10 min. The MFR herein is a value obtained by the MFR measurement method described below.

The MFR is measured, for example, at 297° C. when the fluororesin is the polymer (I-1), at 265° C. when the fluororesin is the polymer (I-2), at 372° C. when the fluororesin is the polymer (II-1), at 372° C. when the fluororesin is the polymer (II-2), at 372° C. when the fluororesin is the polymer (II-3), at 297° C. when the fluororesin is the polymer (II-4), or at 297° C. when the fluororesin is the copolymer (III). The MFR can be determined by measuring the weight (g) of the polymer flowed out of a nozzle (diameter: 2 mm, length: 8 mm) per unit time (10 minutes) under a load of 5 kg using a melt indexer (Toyo Seiki Seisaku-sho, Ltd.).

The fluororesin may have any melting point, and the melting point is preferably 160° C. to 330° C., more preferably 160° C. to 260° C. The melting point of the fluororesin is determined as a temperature corresponding to the maximum value on the heat-of-fusion curve obtained by heating the resin at a rate of 10° C./min using a differential scanning calorimeter (DSC) (Seiko Instruments Inc.).

The fluororesin layer (B) in the present invention may contain one of these fluororesins or may contain two or more thereof.

When the fluororesin is a perhalo polymer, better chemical resistance and lower fuel permeability can be provided. The perhalo polymer is a polymer in which all the carbon atoms constituting the main chain of the polymer are coupled with halogen atoms.

The fluororesin layer (B) may further contain any filler such as inorganic powder, glass fibers, carbon powder, carbon fibers, or metal oxides in accordance with the purpose and the application thereof to the extent that the performance thereof is not impaired.

For example, in order to much lower the fuel permeability, smectite-type lamellar viscous minerals, such as montmorillonite, beidellite, saponite, nontronite, hectorite, sauconite, and stevensite, and high aspect ratio fine lamellar minerals, such as mica, may be added.

In order to impart conductivity, a conductive filler may be added. Any conductive filler may be used, and examples thereof include powder or fiber of conductive simple substance such as metal or carbon; powder of a conductive compound such as zinc oxide; and powder whose surface is subjected to conductivity-imparting treatment. In the case of adding a conductive filler, the filler is preferably melt-kneaded into pellets in advance.

The powder or fiber of conductive simple substance may be any powder or fiber, and examples thereof include powder of metal such as copper or nickel; fiber of metal such as iron or stainless steel; and carbon black, carbon fiber, and carbon fibril described in JP H03-174018 A.

The powder whose surface is subjected to conductivity-imparting treatment is obtained by subjecting the surface of non-conductive powder such as glass beads or titanium oxide powder to conductivity-imparting treatment.

The conductivity-imparting treatment on the surface may be performed by any method, and examples thereof include metal sputtering and electroless plating.

Carbon black is suitably used among the above conductive fillers because of advantages in economic efficiency and prevention of storage of static electric charge.

The fluororesin composition containing a conductive filler preferably has a volume resistivity of $1 \times 10^0$ to $1 \times 10^9$ Ω·cm.

The lower limit thereof is more preferably $1\times10^2$ Ω·cm, and the upper limit thereof is more preferably $1\times10^8$ Ω·cm.

In addition to the filler, other additives such as thermal stabilizers, reinforcing agents, ultraviolet absorbers, and pigments may be optionally added.

(Laminate)

In the laminate of the present invention, the fluororubber layer (A) may have any thickness, and the thickness thereof is preferably 100 μm or greater, for example. The upper limit of the thickness of the fluororubber layer (A) is 5000 μm, for example.

The fluororesin layer (B) may have any thickness, and the thickness thereof is preferably 10 μm or greater, for example. The upper limit of the thickness of the fluororesin layer (B) is 1000 μm, for example.

The laminate of the present invention preferably has an initial interlayer adhesion strength of 10 N/cm or higher. The laminate having an initial interlayer adhesion strength of 10 N/cm or higher is advantageously less likely to cause a shear in vulcanization into an O-ring shape or a hose with a specific shape and peeling even if an impact is applied.

Since the laminate of the present invention has the aforementioned configuration, the laminate can have an initial interlayer adhesion strength within the above range. The initial interlayer adhesion strength is more preferably 15 N/cm or higher, still more preferably 20 N/cm or higher.

The initial interlayer adhesion strength is an average value calculated from the data (N=3) obtained by measuring an adhesion strength by a peel test at a tensile speed of 50 mm/min at 25° C. in conformity with JIS K 6256 (adhesion test of rubber vulcanizate).

In the laminate of the present invention, the fluororubber layer (A) and the fluororesin layer (B) are preferably vulcanization-bonded. Such a laminate can be obtained by stacking the unvulcanized fluororubber layer (A) and the fluororesin layer (B), and then vulcanizing the layers.

The vulcanization may be performed by any conventionally known vulcanization method for fluororubber compositions under conventionally known vulcanization conditions. Examples of the method include a method of vulcanizing a laminate of the unvulcanized fluororubber layer and the fluororesin layer for a long time, and a method of heating a laminate of the unvulcanized fluororubber layer and the fluororesin layer in a relatively short time as a pre-treatment (vulcanization also occurs at this stage), and then vulcanizing the laminate for a long time.

Preferred among these is the method of heating a laminate of the unvulcanized fluororubber layer and the fluororesin layer in a relatively short time as a pre-treatment, and then vulcanizing the laminate for a long time. This is because the method readily provides close bonding between the fluororubber layer and the fluororesin layer in the pre-treatment, and the fluororubber layer is vulcanized in the pre-treatment and thus the shape thereof is stabilized, so that a method of holding the laminate in the following vulcanization can be selected from any various methods.

The pre-treatment conditions may be any conditions. The pre-treatment is preferably performed at 140° C. to 180° C. for 10 seconds to 10 hours using steam, a press, an oven, an air bath, infrared radiation, or microwaves, or by lead-covered vulcanization.

The conditions of the heat treatment (heat treatment after the pre-treatment or heat treatment without the pre-treatment) may be any usual conditions. The heat treatment is preferably performed at 140° C. to 350° C. for 1 minute to 100 hours using steam, a press, an oven, an air bath, infrared radiation, or microwaves, or by lead-covered vulcanization.

The heat treatment is more preferably performed at 150° C. to 300° C. for 5 minutes to 40 hours. The temperature of the heat treatment may be a temperature not higher than the melting point of the fluororesin, and the heat treatment is preferably performed at 150° C. or higher and not higher than the melting point of the fluororesin.

As described above, since the laminate of the present invention can be vulcanization-bonded at a temperature not higher than the melting point of the fluororesin, firm bonding is secured even when the heat treatment is performed at lower temperatures.

The unvulcanized fluororubber layer and the fluororesin layer may be stacked by any of a method of preparing an unvulcanized fluororubber layer and a fluororesin layer separately and then stacking the layers by, for example, compression; a method of simultaneously preparing and stacking an unvulcanized fluororubber layer and a fluororesin layer; and a method of applying a fluororesin to an unvulcanized fluororubber layer to form a fluororesin layer.

In the method of preparing an unvulcanized fluororubber layer and a fluororesin layer separately and then stacking the layers by, for example, compression, a fluororesin and a fluororubber composition may be molded by the same molding method or may be molded by different molding methods.

The unvulcanized fluororubber layer may be obtained by forming the fluororubber composition into any shape such as a sheet or tube by heat compression molding, transfer molding, extrusion molding, injection molding, calender molding, or application.

The fluororesin layer may be formed by, for example, heat compression molding, melt extrusion molding, injection molding, or application (including powder coating). The molding may be achieved using any commonly used molding device for fluororesin, such as an injection molding device, a blow molding device, an extrusion molding device, or any coating device, and a laminate having any shape such as a sheet or tube can be produced. For excellent productivity, melt extrusion molding is preferred.

Examples of the method of simultaneously preparing and stacking an unvulcanized fluororubber layer and a fluororesin layer include a method of molding and simultaneously stacking the fluororubber composition for providing an unvulcanized fluororubber layer and the fluororesin for providing a fluororesin layer by multilayer compression molding, multilayer transfer molding, multilayer extrusion molding, multilayer injection molding, or doubling. In this method, the unvulcanized fluororubber layer and the fluororesin layer are simultaneously stacked. Thus, the method does not require a step of closely bonding the unvulcanized fluororubber layer and the fluororesin layer, and is suitable for achieving firm bonding in the following vulcanization step. If the bonding is insufficient, a closely bonding step such as wrapping may be performed.

(Layer Structure of Laminate)

The laminate of the present invention may have a bilayer structure of the fluororubber layer (A) and the fluororesin layer (B), or may have a structure in which the fluororubber layer (A) is stacked on both sides of the fluororesin layer (B), or in which the fluororesin layer (B) is stacked on both sides of the fluororubber layer (A).

For example, the laminate may have a trilayer structure of fluororubber layer (A)/fluororesin layer (B)/fluororubber layer (A) or of fluororesin layer (B)/fluororubber layer (A)/fluororesin layer (B).

Alternatively, the laminate may have a multilayer structure of three or more layers in which the fluororubber layer (A), the fluororesin layer (B), and another polymer layer (C) are bonded to one another, or a structure in which a polymer layer (D) is stacked on one or both of the sides of the trilayer structure of the fluororubber layer (A), the fluororesin layer (B), and another polymer layer (C) bonded to one another. The polymer layer (C) and the polymer layer (D) may be the same as or different from each other.

The laminate of the present invention may have a polymer layer (C) on one or both of the sides of the trilayer structure of fluororubber layer (A)/fluororesin layer (B)/fluororubber layer (A).

The polymer layers (C) and (D) may be rubber layers (C1) and (D1), respectively, other than the fluororubber layer (A). The rubber layers (C1) and (D1) may be fluorine-free rubber layers (C1a) and (D1a), respectively, formed from a fluorine-free rubber, for example. The fluorine-free rubber is preferred because of good cold resistance and excellent cost efficiency. The fluorine-free rubber layer (C1a) and the fluorine-free rubber layer (D1a) may be formed from the same fluorine-free rubber, or may be formed from different fluorine-free rubbers.

The laminate of the present invention may include the layers stacked in the order of the fluororubber layer (A), the fluororesin layer (B), and the fluorine-free rubber layer (C1a).

Alternatively, the laminate may include the fluorine-free rubber layer (D1a), and the layers may be stacked in the order of the fluorine-free rubber layer (D1a), the fluororubber layer (A), the fluororesin layer (B), and the fluorine-free rubber layer (C1a), in the order of the fluororubber layer (A), the fluororesin layer (B), the fluorine-free rubber layer (D1a), and the fluorine-free rubber layer (C1a), or in the order of the fluororubber layer (A), the fluororesin layer (B), the fluorine-free rubber layer (C1a), and the fluorine-free rubber layer (D1a).

Specific examples of the fluorine-free rubber include diene rubbers such as acrylonitrile-butadiene rubber (NBR), a hydride thereof (HNBR), styrene-butadiene rubber (SBR), chloroprene rubber (CR), polybutadiene rubber (BR), natural rubber (NR), and isoprene rubber (IR), ethylene-propylene-termonomer copolymer rubber, silicone rubber, butyl rubber, epichlorohydrin rubber, acrylic rubber, chlorinated polyethylene (CPE), a polyblend of acrylonitrile-butadiene rubber and vinyl chloride (PVC-NBR), and ethylene-propylene-diene rubber (EPDM). The termonomer of the ethylene-propylene-termonomer copolymer rubber is preferably a monomer constituting a diene rubber such as natural rubber (NR), polybutadiene rubber (BR), isoprene rubber (IR), butyl rubber, or chloroprene rubber (CR).

Rubbers prepared by mixing any of these fluorine-free rubbers with fluororubber at any ratio may be used. For good heat resistance, oil resistance, weather resistance, and extrusion moldability, the fluorine-free rubber is preferably diene rubber or epichlorohydrin rubber. NBR, HNBR, or epichlorohydrin rubber is more preferred. The rubber layer (C1) is preferably formed from NBR, HNBR, or epichlorohydrin rubber.

For good weather resistance and cost efficiency, the rubber layer (D1) is preferably formed from acrylonitrile-butadiene rubber, epichlorohydrin rubber, chlorinated polyethylene (CPE), a polyblend of acrylonitrile-butadiene rubber and vinyl chloride (PVC-NBR), ethylene-propylene-diene rubber (EPDM), acrylic rubber, or any mixture thereof. Unvulcanized rubber compositions for forming the rubber layers (C1) and (D1) may also contain a vulcanizing agent and any other compounding agents.

Next, the layer structure of the laminate of the present invention is described in more detail below.

(1) Bilayer Structure of Fluororubber Layer (A)/Fluororesin Layer (B)

This is a basic structure. Conventional structures of this type suffer insufficient bonding between a fluororubber layer and a fluororesin layer, and thus stacking of the fluororesin layer (B) and the fluororubber layer (A) requires surface treatment on the resin side, application of an additional adhesive between the layers, or fixing of the layers by wrapping a tape-like film, causing complication of the steps. In the present invention, vulcanization leads to vulcanization bonding, so that chemically firm bonding between the layers is achieved without such complicated steps.

(2) Trilayer Structure of Rubber Layer/Fluororesin Layer (B)/Rubber Layer

Examples of this structure include a trilayer structure of fluororubber layer (A)/fluororesin layer (B)/fluororubber layer (A) and a trilayer structure of fluororubber layer (A)/fluororesin layer (B)/rubber layer (C1).

If sealability is required, for example, in the case of joint portions of fuel pipes, the rubber layer is preferably provided on both sides of the structure so as to secure the sealability. The rubber layers of the inner and outer layers may be the same as or different from each other.

In the case of a trilayer structure of fluororubber layer (A)/fluororesin layer (B)/rubber layer (C1), the rubber layer (C1) is preferably a layer formed from acrylonitrile-butadiene rubber, hydrogenated acrylonitrile-butadiene rubber, epichlorohydrin rubber, acrylic rubber, or a mixture of acrylonitrile-butadiene rubber and acrylic rubber.

In order to improve the chemical resistance and the low fuel permeability, a fuel pipe may have a trilayer structure of fluororubber layer (A)/fluororesin layer (B)/rubber layer (C1) in which the rubber layer (C1) is a fluororubber layer and is used as an inner layer of the pipe.

(3) Trilayer Structure of Resin Layer/Fluororubber Layer (A)/Resin Layer

Examples of this structure include a trilayer structure of fluororesin layer (B)/fluororubber layer (A)/fluororesin layer (B). The resin layers of the inner and outer layers may be the same as or different from each other.

(4) Trilayer Structure of Fluororesin Layer (B)/Fluororubber Layer (A)/Rubber Layer (C1)

(5) Structure with Four or More Layers

In addition to the trilayer structures (2) to (4), any of the fluororubber layer (A), the rubber layer (C1), and the resin layer (B) may be further stacked in accordance with the purpose. Another layer such as metal foil may be disposed, and an adhesive layer may be interposed between the layers, excluding between the fluororubber layer (A) and the fluororesin layer (B).

Further, the polymer layer (C) may be stacked to form a lined article.

The parameters such as thicknesses and shapes of the respective layers may be appropriately selected in accordance with the purpose and form of use, for example.

In order to improve the pressure resistance, a reinforcing layer of reinforcing thread, for example, may be appropriately provided.

The laminate of the present invention has excellently low fuel permeability, as well as excellent heat resistance, oil resistance, fuel oil resistance, antifreeze resistance, steam resistance, weather resistance, and ozone resistance. Further, the laminate is sufficiently tolerant of use under severe conditions, and thus can be used in various applications.

For example, the laminate have properties suitable for engine bodies, main drive systems, valve train systems, lubrication and cooling systems, fuel systems, and intake and exhaust systems of automobile engines, transmission systems of driveline systems, steering systems and braking systems of chassis, and gaskets, seals such as non-contact or contact packings (e.g. self-seal packings, piston rings, split ring packings, mechanical seals, oil seals), bellows, diaphragms, hoses, tubes, and electric wires, which are required to have heat resistance, oil resistance, fuel oil resistance, antifreeze resistance, and steam resistance, of basic electrical parts of electrical equipment, electrical parts of control systems, and electrical equipment accessories.

Specifically, the laminate can be used in the following applications:

gaskets such as cylinder head gaskets, cylinder head cover gaskets, sump packings, and general gaskets, seals such as O-rings, packings, and timing belt cover gaskets, and hoses such as control hoses, of engine bodies, anti-vibration rubbers of engine mounts, and sealants for high-pressure valves in hydrogen storage systems;

shaft seals such as crankshaft seals and camshaft seals of main drive systems;

valve stem seals such as engine valves of valve train systems;

engine oil cooler hoses of engine oil coolers, oil return hoses, seal gaskets, water hoses used around radiators, and vacuum pump oil hoses of vacuum pumps, of lubrication and cooling systems; and oil seals, diaphragms, and valves of fuel pumps, fuel hoses such as filler (neck) hoses, fuel supply hoses, fuel return hoses, and vapor (evaporator) hoses, in-tank hoses, filler seals, tank packings, and in-tank fuel pump mounts of fuel tanks, tube bodies and connector O-rings of fuel pipe tubes, injector cushion rings, injector seal rings, injector O-rings, pressure regulator diaphragms, and check valves of fuel injection systems, needle valve petals, accelerator pump pistons, flange gaskets, and control hoses of carburetors, and valve seats and diaphragms of combined air controlling (CAC) systems in fuel systems. In particular, the laminate is suitable for fuel hoses and in-tank hoses of fuel tanks.

The laminate can also be used in the following applications: intake manifold packings and exhaust manifold packings of manifolds, diaphragms, control hoses, and emission control hoses of exhaust gas recirculation (EGR) systems, diaphragms of BPT, after burn preventive valve sheets of AB valves, throttle body packings of throttles, turbo oil hoses (supply), turbo oil hoses (return), turbo air hoses, intercooler hoses, and turbine shaft seals of turbochargers, of intake and exhaust systems;

transmission-related bearing seals, oil seals, O-rings, packings, and torque converter hoses, and gear oil hoses, ATF hoses, O-rings, and packings of ATs, of transmission systems;

power steering oil hoses of steering systems;

oil seals, O-rings, packings, brake fluid hoses, air valves, vacuum valves, and diaphragms of vacuum servos, piston cups (rubber cups) of master cylinders, caliper seals, and boots, of braking systems;

insulators and sheaths of electric wires (harnesses), and tubes of harness-holding parts of basic electrical parts;

cover materials for sensor lines of electrical parts of control systems; and

O-rings, packings, and air conditioner hoses of car air conditioners, and wiper blades, which are exterior parts, of electrical equipment accessories.

In addition to the field of automobiles, the laminate of the present invention can be suitably used in the following applications: oil-resistant, chemical-resistant, heat-resistant, steam-resistant, or weather-resistant packings, O-rings, hoses, other sealants, diaphragms, and valves in a means of transportation, such as shipment and aircraft; similar packings, O-rings, sealants, diaphragms, valves, hoses, rolls, tubes, chemical-resistant coatings, and linings in chemical plants; hoses and gaskets in the field of chemical treatment; similar packings, O-rings, hoses, sealants, belts, diaphragms, valves, rolls, and tubes in food plant equipment and food-related devices (including household utensils); similar packings, O-rings, hoses, sealants, diaphragms, valves, and tubes in nuclear power plant equipment; similar packings, O-rings, hoses, sealants, diaphragms, valves, rolls, tubes, linings, mandrels, electric wires, flexible joints, belts, rubber plates, and weather strips in OA equipment and general industrial parts; and roll blades of plain paper copiers. For example, back-up rubber materials of PTFE diaphragms are poor in lubricity, and thus are worn down or broken during use. In contrast, the laminate of the present invention can solve such problems, and thus is suitably used.

In the case of food-related rubber sealants, there are scent absorption of conventional rubber sealants and contamination of foods by rubber chips. In contrast, the laminate of the present invention can solve such problems, and thus is suitably used. In the case of medical and chemical applications, rubber materials used as sealants for pipes using rubber sealant solvents disadvantageously swell by the solvent. In contrast, the laminate of the present invention can solve such problems because the rubber is covered with resin. The laminate of the present invention can be used to protect rubber materials used in, for example, containers or syringes from chemicals. In general industrial fields, the laminate can be suitably used for rubber rolls, O-rings, packings, and sealants in order to improve the strength, lubricity, chemical resistance, and permeability of rubber materials. In particular, the laminate can be suitably used for packing of lithium ion batteries because the laminate maintains the chemical resistance and the sealability simultaneously. Further, the laminate can be suitably used in applications requiring slidability with low friction.

Further, the laminate of the present invention can be suitably used in the semiconductor field. For example, the laminate can be suitably used for semiconductor manufacturing devices and parts around semiconductor chemicals. The laminate of the present invention can be suitably used for sealants for semiconductor manufacturing processes because the fluororubber does not contain metals or inorganic particles. For example, the laminate of the present invention can be suitably used for O-rings for gate valves, O-rings for quartz windows, O-rings for chambers, O-rings for gates, O-rings for bell jars, O-rings for couplings, O-rings for pumps, O-rings for semiconductor gas control devices, and sealants such as other O-rings, square rings, gaskets, packings, oil seals, bearing seals, lip seals, diaphragms, and oil seals. In particular, the laminate of the present invention is useful as a gate valve sealant because the laminate has dynamic sealing performance such as abrasion resistance or non-adherence.

Further, the laminate of the present invention is suitably used for conveyor belts and driving belts because the laminate has abrasion resistance and lubricity.

The laminate is particularly suitably used as a sealant (in particular, an O-ring), a tube, or a hose.

In other words, the laminate is preferably a sealant, a tube, or a hose. The laminate can be suitably used for parts, among sealants, requiring chemical resistance and low slidability. For good fuel resistance and low fuel permeability, the laminate can be suitably used as a fuel pipe tube or hose for automobiles among tubes. Jigs and fuel pipes used in the semiconductor field may be produced by a common method and the method is not limited.

In particular, the laminate is preferably a sealant for semiconductor manufacturing processes or a fuel pipe hose.

EXAMPLES

The present invention will be more specifically described hereinbelow with reference to, but not limited to, examples.

In the examples and comparative examples, the physical properties were determined by the following methods.

(1) Composition of Polymer

The composition of the polymer was determined by $^{19}$F-NMR analysis.

(2) Melting Point

The melting peak was recorded with a temperature-increasing rate of 10° C./min using a DSC device (Seiko Instruments Inc.), and the temperature corresponding to the maximum value was defined as the melting point.

(3) Melt Flow Rate (MFR)

The weight (g) of the polymer flowed out of a nozzle (diameter: 2 mm, length: 8 mm) per unit time (10 minutes) was determined using a melt indexer (Toyo Seiki Seisaku-sho, Ltd.).

The measurement was performed at 265° C. and 5 kg load on the fluororesin (1) and at 372° C. and 1.2 kg load on the low molecular weight PTFE.

(4) Mooney Viscosity

The Mooney viscosity was determined in conformity with ASTM D 1646.
Measurement apparatus: MV2000E, ALPHA TECHNOLOGIES
Rotor rotation speed: 2 rpm
Measurement temperature: 100° C.

(5) Average Particle Size of Low Molecular Weight PTFE

The average particle size was obtained as the particle size corresponding to a value of 50% of the cumulative volume in the particle size distribution determined using a laser diffraction type particle size distribution analyzer (for example, a product of Japan Laser Corporation) at a pressure of 0.1 MPa and a measurement time of three seconds without cascade impaction.

The materials used in the examples and comparative examples were shown below.

Fluororesin (1) (trade name: RP5000, Daikin Industries, Ltd.) (Melting point 195° C.)

Fluororubber (1) (trade name: G801, Daikin Industries, Ltd.)

(Additive)

Low molecular weight PTFE (tetrafluoroethylene/hexafluoropropylene=99.86/0.14 (wt % ratio)), MFR=1.37 g/10 min (temperature 372° C., load 1.2 kg), average particle size 5.5 μm Multifunctional compound (trade name: triallyl isocyanurate (TAIC), Nippon Kasei Chemical Co., Ltd.)

Peroxide vulcanizing agent (trade name: PERHEXA 25B, NOF Corporation)

MT carbon black (trade name: Thermax N-990, Cancarb Ltd.)

Example 1

Production of Fluororesin Sheet

The fluororesin (1) was pressed at 280° C. for 10 minutes with a spacer placed so as to give a sheet with a thickness of 150 μm (0.15 mm). Thereby, a fluororesin sheet was obtained.

(Production of Fluororubber Sheet (Fluororubber Composition))

The materials shown in Table 1 were kneaded using an 8-inch open roll. Thereby, a sheet-like fluororubber composition (fluororubber sheet) having a thickness of about 3 mm was obtained.

(Production of Laminate)

The fluororubber sheet having a thickness of about 3 mm and the fluororesin sheet having a thickness of about 0.15 mm were stacked with a fluororesin film (10 μm thick) having a width of about 50 mm interposed therebetween on one end portion. Thereafter, the stack was pre-treated by pressing at a pressure of 300 kgf/cm$^2$ at 170° C. for 10 minutes, and then cooled to room temperature. Thereby, a pre-treated laminate having a thickness of 2 mm was obtained. The pre-treated laminate was heat-treated in a heating oven at 250° C. for 2 hours or in a heating oven at 180° C. for 4 hours. Thereby, a vulcanization-bonded sheet-like laminate was obtained.

Examples 2 and 3 and Comparative Examples 1 to 4

The materials shown in Table 1 were kneaded using an 8-inch open roll. Thereby, a sheet-like fluororubber having a thickness of about 2 mm was obtained, and then a sheet-like laminate was obtained as in Example 1.

(Evaluation of Bonding)

The obtained laminate was cut into three sets of strip specimens (10 mm width×40 mm length) each with a grip that was a part where the fluororesin sheet was peeled. The adhesion strength of each specimen was measured by a peel test at a tensile speed of 50 mm/min at 25° C. using an autograph (Shimadzu Corporation, AGS-J 5 kN) in conformity with the method disclosed in JIS K 6256 (adhesion test of rubber vulcanizate). The average value of the obtained data (N=3) was calculated. Further, the peeling mode was observed and evaluated based on the following criteria.

Good: Material corruption of the fluororesin layer or the fluororubber layer occurred on the interface of the laminate to allow no peeling.

Poor: Peeling occurred on the interface of the laminate.

(Evaluation of Roll Processability)

The state of the compound (mass) during kneading using an 8-inch open roll was visually evaluated.

Good: The fluororubber was readily formed into a compound showing favorable windability even when containing additives.

Poor: The fluororubber containing additives took one or more hours to be formed into a compound.

(Evaluation of Abrasion Resistance)

The fluororubber sheet (fluororubber layer) side of the resulting laminate was subjected to evaluation of abrasion resistance in conformity with JIS K 7204 and the abrasion loss was determined under the conditions of abrasive wheels: H-22, load: 1 kg×2, number of 1.5 revolutions: 1000, rotational speed: 60 rpm.
Good: The abrasion loss after the test was less than 0.06 g.
Fair: The abrasion loss after the test was not less than 0.06 g but less than 0.10 g.
Poor: The abrasion loss after the test was not less than 0.10 g.

TABLE 1

| Type of compounding agent of fluororubber composition | Material | Example 1 | Example 2 | Example 3 | Comparative Example 1 | Comparative Example 2 | Comparative Example 3 | Comparative Example 4 |
|---|---|---|---|---|---|---|---|---|
| Base polymer | G801 (parts by mass) | 100 | 100 | 100 | 100 | 100 | 100 | 100 |
| Multifunctional compound (parts by mass) | TAIC (parts by mass) | 15 | 9 | 7 | 4 | 15 | 7 | 4 |
| Vulcanizing agent | PERHEXA 25B (parts by mass) | 3 | 3 | 3 | 3 | 3 | 3 | 1.5 |
| Low molecular weight PTFE | Low molecular weight PTFE (parts by mass) | 30 | 30 | 30 | 30 | — | — | — |
| Carbon | MT carbon black (parts by mass) | — | — | — | — | — | — | 20 |
| | Total (parts by mass) | 148 | 142 | 140 | 137 | 118 | 110 | 125.5 |
| Bonding (vs RP5000) Vulcanization conditions [170° C. × 10 min- 250° C. × 2 hr] | Peeling mode | Good | Good | Good | Poor | Poor | Poor | Poor |
| | Adhesion strength (N/cm) | 37 | 38 | 36 | <1 | 6 | <1 | <1 |
| Bonding (vs RP5000) Vulcanization conditions [170° C. × 10 min- 180° C. × 4 hr] | Peeling mode | Good | Good | Good | Poor | Poor | Poor | Poor |
| | Adhesion strength (N/cm) | 27 | 30 | 31 | <1 | 9 | <1 | <1 |
| Abrasion resistance | Abrasion resistance | Good | Good | Good | Good | Fair | — | Poor |
| | Abrasion loss (g) | 0.038 | 0.039 | 0.040 | 0.042 | 0.062 | — | 0.126 |
| Roll processability | | Good | Good | Good | Good | Poor | Poor | Good |

The abrasion resistance was compared with the abrasion resistance of the fluororubber in Comparative Example 4 having relatively good abrasion resistance. As a result, as shown in Table 1, the abrasion resistance of the fluororubbers containing the low molecular weight PTFE and an increased amount of the multifunctional compound were remarkably enhanced.

INDUSTRIAL APPLICABILITY

The laminate of the present invention can be suitably used as, for example, fuel hoses, oil seals, O-rings, packings, and sealants for semiconductor manufacturing processes.

The inventon claimed is:
1. A laminate comprising:
a fluororubber layer (A); and
a fluororesin layer (B) comprising a fluororesin stacked on the fluororubber layer (A),
the laminate having an initial interlayer adhesion strength of 10 N/cm or higher,
the fluororubber layer (A) being formed from a fluororubber composition,
the fluororubber composition containing a fluororubber, a low molecular weight polytetrafluoroethylene, and a multifunctional compound, the amount of the multifunctional compound being 7 to 15 parts by mass relative to 100 parts by mass of the fluororubber,
wherein the fluororubber composition contains the low molecular weight polytetrafluoroethylene in an amount of 20 to 40 parts by mass relative to 100 parts by mass of the fluororubber,
wherein the fluororubber is a non-perfluororubber having an iodine atom or a bromine atom at an end of the main chain thereof, and is a vinylidene fluoride unit-containing copolymer containing 30 to 80 mol % of the vinylidene fluoride unit and 70 to 20 mol % of a fluorine-containing ethylenic monomer unit (a) relative to 100 mol % of the total of the vinylidene fluoride unit and the fluorine-containing ethylenic monomer unit (a),
wherein the multifunctional compound is triallyl isocyanurate,
wherein the low molecular weight polytetrafluoroethylene is a tetrafluoroethylene polymer having a melt viscosity at 380° C. of $1 \times 10^2$ to $7 \times 10^5$ Pas, and an average particle size of 0.5 to 20 μm, and is a modified polytetrafluoroethylene in which an amount of a modifying monomer unit copolymerizable with tetrafluoroethylene is 0.01% to 1% by weight in all the monomer units,
wherein the vinylidene fluoride unit-containing copolymer is at least one copolymer selected from the group consisting of vinylidene fluoride/hexafluoropropylene copolymer and vinylidene fluoride/hexafluoropropylene/tetrafluoroethylene copolymer,
wherein the vinylidene fluoride/hexafluoropropylene copolymer has a mole ratio vinylidene fluoride/hexafluoropropylene of (45 to 85)/(55 to 15),
wherein the vinylidene fluoride/hexafluoropropylene/tetrafluoroethylene copolymer has a mole ratio vinylidene fluoride/hexafluoropropylene/tetrafluoroethylene of (40 to 80)/(10 to 35)/(10 to 35),
wherein the fluororesin is (I) a copolymer obtained by polymerization of at least 20 to 80 mol % of tetrafluoroethylene, 10 to 80 mol % of ethylene, 0 to 30 mol % of hexafluoropropylene, and 0 to 10 mol % of a monomer copolymerizable with tetrafluoroethylene and ethylene.

2. The laminate according to claim 1,
wherein the fluororubber composition contains a peroxide vulcanizing agent.

3. The laminate according to claim 1,
wherein the fluororubber layer (A) has an abrasion loss determined according to a wear test specified in JIS K 7204 of 0.10 g or less.

4. The laminate according to claim 1,
wherein the fluororubber layer (A) is stacked on both sides of the fluororesin layer (B).

5. The laminate according to claim 1,
wherein the fluororesin layer (B) is stacked on both sides of the fluororubber layer (A).

6. The laminate according to claim 1, further comprising a fluorine-free rubber layer (C1a),
wherein the layers are stacked in the order of the fluororubber layer (A), the fluororesin layer (B), and the fluorine-free rubber layer (C1a).

7. The laminate according to claim 6, further comprising a fluorine-free rubber layer (D1a),
wherein the layers are stacked in the order of the fluorine-free rubber layer (D1a), the fluororubber layer (A), the fluororesin layer (B), and the fluorine-free rubber layer (C1a); in the order of the fluororubber layer (A), the fluororesin layer (B), the fluorine-free rubber layer (D1a), and the fluorine-free rubber layer (C1a); or in the order of the fluororubber layer (A), the fluororesin layer (B), the fluorine-free rubber layer (C1a), and the fluorine-free rubber layer (D1a).

8. The laminate according to claim 1,
wherein the fluororubber layer (A) and the fluororesin layer (B) are vulcanization-bonded to each other.

9. The laminate according to claim 1, which is a sealant for semiconductor manufacturing processes or a fuel pipe hose.

* * * * *